March 29, 1960  J. R. BARANYI  2,930,727
AMINOPLASTIC RESIN IMPREGNATED LAMINATES
Filed Sept. 26, 1958  2 Sheets-Sheet 1
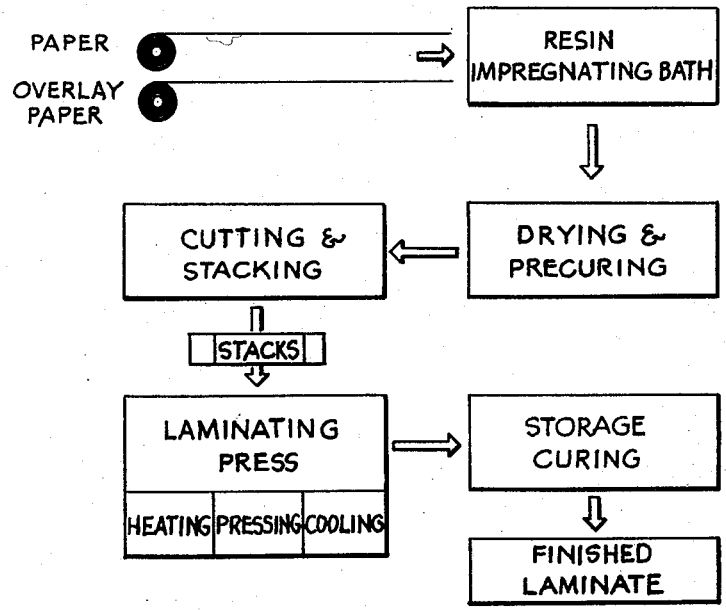
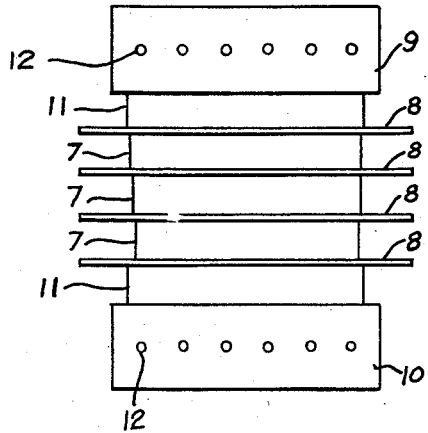
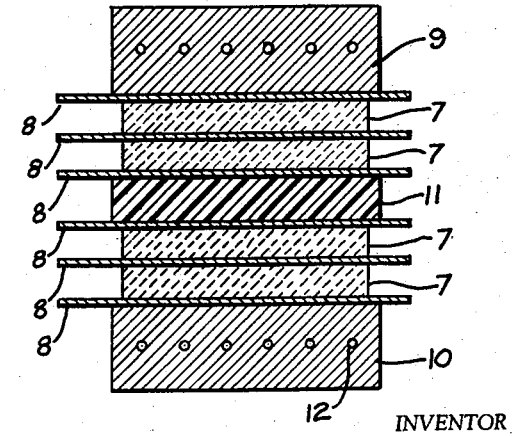
INVENTOR
JOSEF BARANYI
BY Toulmin & Toulmin
ATTORNEYS March 29, 1960 J. R. BARANYI 2,930,727
AMINOPLASTIC RESIN IMPREGNATED LAMINATES
Filed Sept. 26, 1958 2 Sheets-Sheet 2

INVENTOR
JOSEF BARANYI

BY Toulmin & Toulmin
ATTORNEYS

United States Patent Office 2,930,727
Patented Mar. 29, 1960

2,930,727

AMINOPLASTIC RESIN IMPREGNATED LAMINATES

Josef Rudolf Baranyi, Ulm (Danube), Germany

Application September 26, 1958, Serial No. 763,616

Claims priority, application Germany March 17, 1958

3 Claims. (Cl. 154—46)

This invention relates to improved synthetic resin impregnated laminates and to novel techniques for manufacturing the same. More particularly, this invention relates to a novel class of laminates impregnated with a new type of impregnating agent, one principal component of which is a heat-curable amidogen-aldehyde aminoplastic composition.

The terminology adopted in this application follows that established by H. P. Wohnsiedler and others who are leading in the lamination art. Thus, the term "amidogen compound" as used herein and in the appended claims is employed as defined by H. P. Wohnsiedler in Patent No. 2,801,226.

Among these aminoplastic compositions, which comprise urea formaldehyde resins and melamine formaldehyde resins, the latter resins have gained the greatest importance in the art of producing laminates.

It is conventional to prepare an impregnating bath being a more or less sirupy solution, in water or alcohol, of melamine or a melamine derivative, formaldehyde, and other adjuvants. Numerous impregnating compositions have been described in the art, for instance in Patents Re. 22,402; 2,302,765; 2,732,325; 2,773,794; 2,822,347; and many others.

In the conventional manufacture of aminoplastic resin impregnated laminates, a web of sheet material such as paper, cloth, sheet asbestos, glass cloth, fabrics composed of nylon, polyacrylonitrile fibers and the like is moved through the impregnating bath, the resulting impregnated web is dried, cut into individual sheets, a plurality of the latter are superimposed to form a laminate stack and the stack is then compressed, under heating and thereby curing the impregnated, and the final laminated article is obtained.

Conventionally, the final laminating step requires pressures in the order of 50–100 kg./cm.$^2$, at temperatures ranging from about 130–150° C., and curing times in the order of about 10 to 30 minutes. At higher temperatures, there would occur decomposition and decoloration of the laminate. The laminate is then cooled and stored. The press-curing time lasts usually from about 15 to 60 minutes, during which time there is applied the full temperature as well as the full pressure. The laminate is then cooled while maintaining the full pressure, which requires another 10 to 25 minutes depending on the type of cooling system associated with the press used.

The pressure treatment is now usually carried out in modern multi-stage presses such as, for instance, automatic multi-stage laminating presses built by Siempelkamp A.G., Krefeld, Germany, which permit a production of 4,000 tons of laminated plates per day.

In spite of the great importance gained especially by melamine resin-impregnated laminate plates in many fields of industry, the presently produced laminated plates suffer from a number of drawbacks, the most important one being that it has thus far not been possible to produce laminate plates of a thickness below 1.0 millimeter (mm.) which still fulfill the requirements as to stability raised for instance according to NEMA (National Electrical Manufacturers Association, New York) standard, DIN (Deutsche Industrie-Norm, Germany) standard, or similar internationally recognized standards.

When plates thinner than 1.0 mm. have been produced, they were unable to meet any of the above-mentioned or similar standards, but were excessively brittle and lacking in particular in hardness, tensile strength and bending strength.

Furthermore these thin plates suffer from another decisive drawback, namely they are not free from internal tensions and, therefrom, are always warped, especially by being curved, i.e. of an arc-shaped cross section in one direction while being flat in the base direction perpendicular thereto.

One reason for this latter drawback is probably the lack of equilibrium in the structural arrangement of the finished laminate which is due in particular to the fact that such laminates usually contain core sheets, print sheets and/or decorative sheets, some or all of which sheets have been impregnated with different types of resins, and that during the heat-curing step, differences in molecular forces within and between each layer of different resin are created.

For instance, a conventional laminate as described in Patent 2,732,325, is composed of a laminated core, a print sheet and an overlay sheet. The overlay sheet usually contains about 250 to 300 parts by weight of melamine or the like resin for every 100 parts of paper, the print sheet contains about 70 to 100 parts of melamine resin per 100 parts of paper, and the core containing 50 to 60 parts of phenol formaldehyde resin; as a further feature, the paper in the overlay is usually alpha-cellulose paper, the print sheet contains printed cellulose paper and the core kraft paper. Warping of these laminates can be explained by assuming that the core layer of the laminate shows greater elongation than the overlay.

Even laminate plates of the conventionally manufactured thicknesses of 1.2 to 1.6 mm. are usually not free from inner tension expressed in a slight warping depending on the temperature of the surrounding atmosphere.

It is, therefore, an object of my invention to provide a new type of laminate sheet or plate that can be produced with thicknesses about half as great as those of the conventional plates and still much thinner, while being completely free from any tendency of warping, and having otherwise mechanical properties which are at least in the same order or even better than those of the conventional melamine-hardened resin-containing and compressed laminate sheets or plates.

It is another important object of my invention to provide a process in which the production time for the aforesaid new plates or sheets is much shorter than the time required by the corresponding production steps of making conventional plates, thereby making the entire manufacturing process for amidogen-aldehyde aminoplastic resin-impregnated laminates much more economical.

These objects are achieved in the new class of laminated sheets and the like articles, described in their mechanical and chemical properties in greater detail further below, and in my process for producing these new laminates which comprises the steps of (A) Preparing a novel impregnating composition consisting of (1) An aqueous or a water-alcohol solution of certain aminoplastic resin condensates derived from an aldehyde and an amidogen compound, (2) Certain water-insoluble, but swellable long-chain polymeric compounds suspended in the aforesaid aqueous solution, (3) A primary agent for limiting the swellability in water of the insoluble polymeric compound; and so as to prevent any solution accelerating of the condensation process in the press and increasing the hardness due to its acidic character; and eventually (4) A secondary modifying, i.e. distributing and curing agent for facilitating the uniform and rapid distribution of the impregnating composition in a carrier material to be impregnated, as well as the later heat-curing of the stack of impregnated sheets under pressure at a controllable rate; the curing action of this agent becomes effective only after chemical changes incurred in a subsequent heating step;

(B) Impregnating carrier webs or sheets consisting of the conventional overlay and/or decorative printed papers, or of cloth of wool, silk etc., sheet asbestos, glass cloth, fabrics composed of nylon, polyacrylonitrile fibers, Dacron, Orlon, Perlon, and the like; with the novel impregnating composition;

(C) Drying the impregnated sheets under a certain degree of pre-curing;

(D) Eventually cutting the sheets to size and assembling the same in stacks of two or more sheets, and (E) Pressing the stacks in a conventionally heated laminating press under controllable excess pressure and, eventually, one brief relief for permitting gases developed during the chemical condensation reactions in the impregnate to escape;

(F) Interrupting heating well prior to a complete curing of the impregnate in the stack at a determined intermediate curing stage; this stage is reacted as soon as the laminate is sufficiently cured to be easily removed from the press, which stage is determined by a trial run for each impregnating bath and press.

(G) Cooling the resulting laminate while initially maintaining and then gradually decreasing pressure in the press until approximately room temperature and atmospheric pressure is attained; and (H) Permitting curing of the impregnate in the laminate to be completed during storage for a minimum length of time; thereby reducing by half or even more the occupation time of the press by a stack to be laminated from the conventionally required 15 to 30 minutes from the time of attaining full operational temperature in the press until the time of cooling to substantially room temperature (25° C.). However, the laminates, according to the invention can be transported and worked immediately upon leaving the press, while the storage-curing still progresses.

THE NEW IMPREGNATING BATH

As the base component in the preparation of the new impregnating bath, I use water-soluble aminoplastic resins derived from (1) An aldehyde, preferably formaldehyde, although the other aldehydes listed as suitable in the art, such as paraformaldehyde, other compounds engendering formaldehyde such as, for instance, hexamethylenetetramine, and, furthermore, acetaldehyde, propionaldehyde, butyraldehyde, acrolein, methacrolein, crotonaldehyde, octaldehyde benzaldehyde, furfural, mixtures thereof, or mixtures of formaldehyde, or HCHO-engendering compounds, with such other aldehydes may also be used, should economic considerations permit the same;

(2) An amidogen compound, preferably melamine, and in the second place, urea; other amidogen compounds as listed, for instance, in Patent 2,524,727 may probably be used with somewhat similar beneficial results; however, experiments with such compounds have not yet been completed.

In the dissolved state, these aminoplastic resins as used in the bath according to my invention, must be capable of forming genuine solutions, being then in a micromolecular state, and not in a macromolecular colloidal state, either dissolved in water, or a mixture of water and alcohol where economic considerations permit the latter.

As amidogen-formaldehyde resins suitable for the purposes of my invention, I use, for instance, commercially available melamine-formaldehyde resins such as "Madurit T2" manufactured by Cassella Werke, Frankfurt am Main, Germany, "Resimene 817" and "Resimene 824," both manufactured by Monsanto Chemical Company, St. Louis, Missouri, and "Melmac 405" manufactured by American Cyanamide, New York, N.Y. The production of these and similar suitable resins is well known in the art.

Secondly, I use as urea formaldehyde resin an aqueous solution "K 2021" produced by Badische Anilin & Sodafabrik, Ludwigshafen, Germany, which contains 50% by weight of solids.

Resins available in powdered form, such as the above-named melamine formaldehyde resins are dissolved in water, or eventually in a mixture of water and a few percent of alchol, in amounts of 40 to 60 parts by weight in 100 parts of the solution, and preferably of 50 to 55 parts. Dissolution is preferably effected at 30°–40° C.

As the polymeric compound, I have used polyvinyl acetate in a macromolecular dispersed state to which the swelling controlling agent has been added prior to admixture to the resin solution. I have also employed copolymers of polyvinyl acetate and polyvinyl chloride containing up to 50%, but preferably only up to 40% of the latter.

A suitable polyvinyl acetate dispersion used by me is commercially available under the trademark "Vinnapas D50" and is manufactured by Wacker-Chemie, Munich, Germany, and "Mowilit D50," produced by Farbwerke Hoechst, Frankfurt am Main, Germany.

I use about 1 to 5 parts by weight of a dispersion of the polyvinyl acetate having a solid matter content of 50% by weight, for every 100 parts by weight of the aminoplastic resin solution, or for approximately every 50 parts of the solid aminoplastic resin contained in the bath.

Together with polyvinyl acetate or polyvinyl chloride solutions I also use as an adjuvant polyvinyl alcohol, for instance "Polyviol" produced by Wacker-Chemie, Munich, Germany, and "Mowiol" produced by Farbwerke Hoechst, Frankfurt am Main, Germany. Impregnated and cured laminates obtained with the aid of a bath containing polyvinyl acetate and polyvinyl alcohol may be pressed at temperatures higher than the conventional temperatures of about 150° C., by raising the heat-pressure-curing temperature to about 170° C. This permits a further shortening of the time of occupying the laminating press.

As the primary control agent limiting the swelling of the polymeric compound in the dispersing phase in which it is used, I prefer to use glyoxal, preferably in an aqueous solution containing about 30% by weight of CHO.CHO, of which solution I add from 2–3 parts by weight to every 100 parts of polymeric dispersion, or approximately 0.02 to 0.03 part to every 100 parts of the impregnating bath.

Although it would seem that glyoxal could be replaced by other aldehydes such as formaldehyde, I have surprisingly found that none of the other aldehydes tried out by me leads to the fully satisfactory results obtained with glyoxal. I believe that this is due to the fact that glyoxal forms methylal addition compounds with the polyvinyl acetate or chloride and the polyvinyl alcohol components. In order to achieve approximately the same results with formaldehyde, such large amounts of the latter would require that there is danger of forming a precipitate of polyvinyl acetate from the dispersed state. This may lead to a sticking of the laminates at the metal press plate due to segregation of polyvinyl acetate at the surface of the stack to be laminated.

However, it is probable that the higher homologues of glyoxal such as propane-1,3-di-al, $CHO \cdot CH_2 \cdot CHO$, butane-1,4-di-als $CHO \cdot CH_2 \cdot CH_2 \cdot CHO$ or $$CHO \cdot CH(CH_3) \cdot CHO$$

and the like substances will show a similar activity as glyoxal. Experiments with these substances have not yet been completed.

There can be assumed a synergistic effect between the three main components of the impregnant according to my invention, namely (a) The amidogen formaldehyde resin
(b) The polyvinyl acetate, or chloride, with or without polyvinyl alcohol, and
(c) Glyoxal.

Components (a) and (c) alone lead to laminates of conventionally known properties, and if thinner than conventional laminates are produced, the brittleness of the latter is so great that the standard requirements as to mechanical properties, such as the water-resistance can no longer be fulfilled.

Components (a) and (b) alone have the drawback that the formaldehyde still present in the component (a) prior to complete curing will lead to the precipitation of component (b), its segregation on the surface of the stack, and consequently, to faulty laminates.

The surprising effect of glyoxal as distinguished from other aldehydes is perhaps due to the fact that glyoxal becomes decomposed, during the process according to my invention into glyoxalic acid, acetic acid and formic acid. This is the more surprising as it was generally believed in the art that the presence of formic acid in the curing process must be substantially avoided.

The time required for pressing the laminate in the laminating press, counting from the time of attaining full pressing temperature until the time of attaining room temperature while gradually decreasing and finally releasing pressure can be shortened particularly effectively, and other important advantages can be obtained by using, as a further adjuvant, a secondary cure-controlling agent.

This secondary agent which I use in amounts of 0.4 to 0.6 part by weight for every 100 parts of aminoplastic resin solid, in the impregnating bath composition according to the invention, is asymmetric glycerol alpha-dichlorohydrin

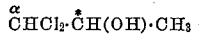

the asterisk designating the asymmetric carbon atoms.

The secondary agent is a substance which simultaneously improves the distribution of the impregnant in the carrier web or sheet, due probably to a wetting effect, on the cellulosic material of the latter, enhances the curing velocity and increases the hardness attained by the curing process in the resulting laminate. The modifying agent does not act as a catalyst, but is decomposed and consumed in the laminating process.

Patent 2,769,796 already describes co-condensates of melamine resins with epichlorohydrin, glycerol, alpha-dichlorohydrin and other monofunctional and difunctional halohydrin reaction products with ammonia and polyalkylene polyamine. Such co-condensates harden at room temperature and are used in the production of wet-strength paper. These co-condensates are not suitable as impregnates for the production of laminates because they harden instantly and lack the capability of flow required during the pressing step of melamine resin lamination.

I have discovered that the synergistic effect of the alpha-dichlorohydrin adjuvant in the impregnating bath according to my invention will only occur if the amount of this agent does not exceed 0.5% by weight calculated on the total weight of solid resin content in the bath. A noticeable synergistic effect can already be achieved by the addition of 0.05% of the modifying agent.

Depending on the length of storage time required for the impregnated and dried sheets or webs, the amount of alpha-dichlorohydrin must be limited to less than 0.01% if the storage is to last a longer time, for instance, several months; the amount of alpha-dichlorohydrin should not exceed 0.02% if the impregnated and dried sheet or web is to be stored for up to one month; if 0.05% of the secondary agent is used, the storage time should be limited to a week, and with larger amounts of the secondary agent storage must be correspondingly shorter or, in extreme cases, the laminating step must follow immediately after the impregnating and drying step.

An important advantage of the process according to my invention resides in the fact that the impregnated and dried sheet or web material can be stored under normal atmospheric conditions, i.e. without requiring special precautions with regard to reducing the humidity of the air. This is so due to the fact that the carrier material impregnated and dried according to the process of my invention does not absorb humidity from the atmosphere but on the contrary gradually loses its humidity content during storage.

While it has been conventional practice to provide for a pH of the impregnating bath of 8 and higher up to 10, I prefer, as a further distinctive feature of my invention, to operate at a neutral pH of 7 or even with a slightly acidic pH. Furthermore, it has been conventional to require of the impregnate, in the stack to be laminated, a certain amount of flow of at least 8%, prevailing at least during the initial stages of the pressing steps. This flow is conventionally determined by a standard flow test described for instance in Example II of Patent 2,773,794.

Thus far, it was generally assumed in the laminating industry that a minimum flow of 8% would be required to make an impregnate suitable for lamination. In contrast thereto, I employ an impregnate, the flow of which under the above-mentioned standard test is preferably 0%.

It is a very important distinctive feature of my invention that the gradually progressing storage curing process in the laminate according to my invention leads to a tough elastic hardened product and not to a brittle hardened product as is the case when the conventionally produced laminates are age-hardened.

The preparation of the impregnating bath shall be illustrated in further detail with the aid of a number of examples given hereinafter, which are, however, not to be considered as necessarily limitative of the scope of the invention.

*Example I*

COMPONENT A 1000 g. of a commercially available pulverized, melamine formaldehyde having a viscosity, in 50% aqueous solution, of 125 centipoises, and produced as described in Patents 2,328,529; 2,338,143; 2,455,392; German Patent 647,303; French Patents 954,682; 967,251 and 967,467; and elsewhere, are dissolved in about 1000 milliliters (ml.) of water of about 35° C.

COMPONENT B 1000 g. of a commercially available polyvinyl acetate dispersion in water containing 50% by weight of solids is further diluted by adding 1000 g. of water; 5 grams of glyoxal are added to the diluted dispersion. 20 grams of this dispersion are added to the 2000 grams of Component A; and 10 grams of dichlorohydrin are then added to the resulting mixture.

This impregnating bath will lead to a laminate having a hardness of about 5000 kg./cm.$^2$, a bending strength of about 1200 kg./cm.$^2$, and a tensile strength of about 800 kg./cm.$^2$, provided the thickness of the laminate is 0.6 mm. and the degree of impregnation of the entire laminate is substantially uniform.

If carrier sheets impregnated with this bath are dried and thereby pre-condensed at a temperature above 120° C. as preferred in the process according to my invention, the pressure laminating step should follow within five to eight hours.

Example II

Example I is repeated, but only 5 grams of dichlorohydrin are added to the bath.

The carrier sheets impregnated with this impregnant, when pre-cured above 120° C. must be laminated within 12–15 hours; or when pre-cured at about 90° C., then lamination must take place within 24 hours.

Example III

Example I is repeated, but only 0.5 grams of dichlorohydrin are added to the bath.

Carrier sheets or webs, impregnated with this bath and pre-cured by drying at about 120°–130° C. can be laminated within one week. The bending strength of the resulting laminate will be 1300 kg./cm.$^2$, and the tensile strength of about 1000 kg./cm.$^2$.

Example IV

Example I is repeated, but only 0.2 gram of dichlorohydrin is added to the bath.

Impregnated and pre-cured sheets may be stored for several weeks prior to lamination.

Example V

The same melamine formaldehyde resin solution as in Example I is prepared.

The same diluted polyvinyl acetate dispersion is prepared as in Example I, but 10 grams of glyoxal are used instead of 5 grams in Example I. 40 grams of the resulting dispersion are added to the 2000 grams of the resin solution; and 0.1 gram of dichlorohydrin is then added thereto.

The impregnated and pre-cured carrier material can be stored for a long time. The finished laminate shows a noticeably increased elasticity, but still well above the standard requirement.

Example VI

Example V is repeated, however, 200 grams of the resulting dispersion are added to the 200 g. of resin solution according to Example I. 0.1 gram of dichlorohydrin is added.

The elasticity of the laminate is still further increased, and the hardness of the laminate is still about 3000–3500 kg./cm.$^2$.

Examples VII–XII

Component A is prepared as described in Example I.

Component B is prepared by first dissolving 10 grams of commercially available polyvinyl alcohol in 90 ccs. of warm water; then diluting 1000 grams of a commercially available polyvinyl acetate solution having a solids content of 50% by weight with 900 ccs. of water and mixing the same with the polyvinyl alcohol solution, and finally adding 10 grams of glyoxal to the mixture.

The following amounts of Component B are then admixed to Component A to obtain the impregnating bath according to the invention:

| Example No. | Component A, grams | Component B, grams | Influence on Mechanical Properties of Finished Laminate | | |
|---|---|---|---|---|---|
| | | | Tensile Strength | Hardness | Bending Strength |
| VII | 2,000 | 10 | 880 | 5,310 | 1,310. |
| VIII | 2,000 | 20 | 1,170 | 4,910 | 1,190. |
| IX | 2,000 | 40 | laminate becoming more elastic. | laminate becoming softer. | laminate becoming more brittle. |
| X | 2,000 | 60 | | | |
| XI | 2,000 | 100 | | | |
| XII | 2,000 | 200 | | | |

The carrier webs impregnated with one of the impregnating baths described in Examples VII–XII can be stored after the pre-curing step for several months.

Examples XIII–XVII

Components A and B are produced as described in Example III, but the amount of Component B added to Component A is varied.

| | Component A | Component B, grams |
|---|---|---|
| XIII | on melamine HCHO basis | 10 |
| XIV | | 40 |
| XV | | 60 |
| XVI | | 100 |
| XVII | | 200 |

Examples XVIII–XXIII

Component A is prepared as in Example I, however, a commercially available urea formaldehyde resin containing 50% by weight of solids is used instead of the melamine formaldehyde used in the aforesaid example.

Components B and further adjuvants are added thereto as described in Example I to obtain the impregnating bath.

| | Component A | Component B |
|---|---|---|
| XVIII | on urea HCHO basis | 10 |
| XIX | | 20 |
| XX | | 40 |
| XXI | | 60 |
| XXII | | 100 |
| XXIII | | 200 |

Examples XXIV–LX

Examples XVIII–XXIII are repeated but each time asymmetric alpha-dichlorohydrin is added to the mixture of components A and B, in amounts as indicated in the following table:

| Addition of Component B to Component A (Example) | Amount of asymmetric alpha-dichlorohydrin added to mixture of A + B (grams) | | | | | |
|---|---|---|---|---|---|---|
| | 0.1 | 0.2 | 0.5 | 2 | 5 | 10 |
| 10 grs., XVIII | Examples XXIV–XXX. | | | | | |
| 20 grs., XIX | Examples XXXI–XXXVI. | | | | | |
| 40 gr. M, XX | Examples XXXVII–XLII. | | | | | |
| 60 grs., XXI | Examples XLIII–XLVIII. | | | | | |
| 100 grs., XXII | Examples XLIX–LIV. | | | | | |
| 200 grs., XXIII | Examples LV–LX. | | | | | |

Examples LXI–XCVI

Examples VII–XII are repeated, but each time asymmetric alpha dichlorohydrin is added to the mixture of components A and B in amounts as indicated in the following table:

| Addition of Component B to Component A (Example) | Amount of asymmetric alpha-dichlorohydrin added to mixture of A + B (grams) | | | | | |
|---|---|---|---|---|---|---|
| | 0.1 | 0.2 | 0.5 | 2 | 5 | 10 |
| 10 grs., VII | Examples LXI–LXVI. | | | | | |
| 20 grs., VIII | Examples LXVII–LXXII. | | | | | |
| 40 grs., IX | Examples LXXIII–LXXVIII. | | | | | |
| 60 grs., X | Examples LXXIX–LXXXIV. | | | | | |
| 100 grs., XI | Examples LXXXV–XC. | | | | | |
| 200 grs., XII | Examples XCI–XCVI. | | | | | |

The further steps of the process according to my invention and the various kinds of laminates produced thereby shall be described hereinafter in connection with the accompanying drawings in which Figure 1 is a flow sheet illustrating the steps of the process according to the invention.

Figure 11 illustrates schematically a laminating press comprising, by way of example, four stacks of impregnated sheets to be laminated and a pressure equalizing cushion according to my invention.

Figure 12 illustrates schematically a prior art laminating press employing pressure equalizing cushions.

As step I in the process illustrated in the flow sheet of Figure 1 a carrier web consisting of overlay or print paper is conducted through the impregnating bath according to my invention.

I use a conventional horizontal impregnating machine, for instance, of the type manufactured by Frank W. Egan, Summerfield, Mass., or by Keller & Prahl, Eschwege, Germany.

Overlay paper is conducted through the bath, for instance over an immersion path of 2.5 meters' length with a velocity of 6.5 meters per second, while print paper is conducted through the bath at a velocity of 4.5 meters per second. The web is then conducted through a pair of squeezing cylinders which remove the excess of impregnant from the web.

As the next step II, the impregnated web is conducted through a drying chamber. In this chamber the web is dried in a conventional manner at a temperature of 120–140° C.

Due to the novel composition of the impregnating bath according to my invention, the pre-curing effect achieved by the drying step leads to the reduction of the flow to 1% to almost 0% in the pre-cured impregnant in the web, when tested as described in Example II of U.S. Patent 2,773,794.

Depending on the type of impregnation bath used, the web must be further processed within a few hours, a day, a week, a month or a longer period.

According to step III of the process of my invention, the impregnated and pre-cured web is then cut into sheets and stacked in various manners.

A number of modes of stacking impregnated carrier webs are illustrated in Figures 2 to 8, by way of example, only, since a great number of other variations of stacking are possible.

Figure 2:
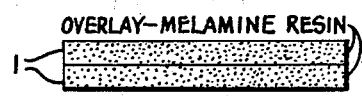
Figures 2 to 8 illustrate in cross sectional view various laminates produced by the process according to my invention.

Thus, Figure 2 illustrates a stack consisting of two overlay papers 1 of alpha-cellulose both impregnated with an impregnant on a melamine formaldehyde basis, for instance, as described in Example I. The overlay contains about 200 to 300 grams of impregnant per 100 grams of alpha-cellulose.

The next following lamination step IV is carried out as described in more detail hereinafter and leads to a laminate, in the case of the stack illustrated in Figure 2, which has a thickness of about 0.12 mm.

Figure 3:
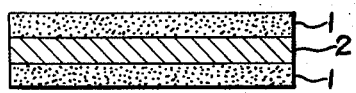

Figure 3 illustrates a stack consisting of a print paper 2 impregnated, for instance, with the impregnant described in Example VII, and containing, after pre-curing by the drying step, 70–100 grams of the pre-cured impregnant per 100 grams of paper, between a top and a bottom overlay layer 1, impregnated with the same impregnating bath of Example VII. After lamination, the resulting sheet has a thickness of about 0.4 millimeter.

Figure 4:

Figure 4 illustrates a stack composed in a similar manner as Figure 3. However, the print paper has been impregnated with the impregnating bath described in Example XVIII. The resulting laminate differs from that illustrated in Figure 2 by not being resistant to the Test for Immersion in Boiling Water (LP 2–2.07 of the NEMA standards), while the laminate of Figure 2 is resistant.

Figure 5:

Figure 5 illustrates a stack consisting of an overlay 1 impregnated with an impregnant on melamine formaldehyde basis as described in Example V and containing, after drying, 200 grams of pre-cured impregnant for every 100 grams of alpha-cellulose, and a print paper 3 having approximately the same absorptivity as the overlay paper 1, and being impregnated with the same impregnant as overlay 1. After pressing, a laminate is obtained which has a thickness of 0.2 mm. and is completely free of internal tensions and consequently of warping.

Figure 6:

Figure 6 illustrates a stack similar to that illustrated in Figure 5, however, the overlay 4 and the print paper 5 are both impregnated with the impregnant on urea formaldehyde basis described in Example XVIII. Again, the composition and amount of impregnant per every 100 grams of paper must be substantially the same in both layers in order to obtain a laminate free from internal tensions and consequently free from warping.

Figure 7:

In Figure 7, the two-layer stack consists of an overlay paper 1 and a print paper 5. The overlay paper is impregnated, for instance, with the impregnant on melamine formaldehyde basis described in Example XI, and the print paper is impregnated with the impregnant on urea formaldehyde basis described in Example XIX. After pressing a laminate is obtained which has a thickness of 0.2 mm. and is free from internal tensions and warping.

Figure 8:
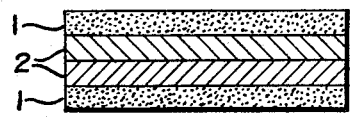

Figure 8 illustrates a further type of stack consisting of a top and a bottom overlay layer 1 and two intermediate print paper layers 2. The overlay papers are, for instance, with the impregnant described in Example VII, while the print papers are impregnated with the impregnants illustrated in Example IX.

The overlays contain, for instance, 250 grams of pre-cured impregnant per 100 grams of alpha-cellulose, while the print paper layers contain, for instance, 80 grams of impregnant per 100 grams of print paper.

The resulting laminate has a thickness of about 0.6 mm., and is a highly elastic plate, free from inner tensions and consequently from warping, and with an excellent surface hardness. The plate has a bending strength, determined according to DIN (German Industrial Standards) 53, 452 of 1190 kg./cm.², a tensile strength, determined according to DIN 53, 455 of 1171 kg./cm.², a hardness determined with a universal hardness testing device "Diatestor" in a conventional manner with a steel ball of 5 mm. diameter under a load of 50 kg. for 60 seconds, amounting to 4912 kg./cm.².

In a similar manner, a stack can be composed of the same types of layers as illustrated in Figure 8, wherein the overlays are impregnated with the impregnant of Example VII, and wherein the print papers are impregnated with the impregnant described in Example XII, all other conditions being the same, as in the case of Figure 8. The resulting laminate has approximately the same hardness and tensile strength as the laminate on the basis of Figure 8, while the bending strength of the plate is considerably low, i.e. the plate is much more flexible.

Naturally, plates can also be made, for instance, of the conventional thicknesses in the order of 1.2 to 1.6 mm. and higher by laminating stacks containing a correspondingly greater number of layers.

Figure 9:
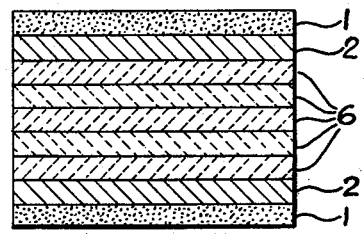
Figures 9 and 10 illustrate in cross sectional view laminates of greater thickness produced by the process according to the invention by incorporating a greater number of sheets in the laminates.

Figure 9 illustrates a stack corresponding to a laminate of this type and consisting of a top and a bottom overlay 1 impregnated with the bath of Example VII, upper and lower print paper layers 2 impregnated with the bath of Example IX, the amounts of impregnant contained in layers 1 and 2 being, for instance, the same as in the stack of Figure 8. Between the two last-mentioned layers 2, the stack contains five layers 6 consisting of kraft paper impregnated with the bath of Example X and containing 60 grams of the pre-cured impregnant per 100 grams of kraft paper. The resulting laminate has a thickness of 1.3 mm. and approximately the same mechanical properties as the laminate corresponding to Figure 8. A more economical laminate can be obtained if the layers 6 are impregnated with the bath described in Example XXII on urea formaldehyde basis. The mechanical properties of this laminate are substantially the same as those of the laminate according to Figure 9, except that this laminate is not resistant to the test for immersion in boiling water, supra. Both laminates according to Figure 9 are free from internal tension and warping.

The thickness of the finished laminate can be varied by a correspondingly smaller or higher number of kraft paper layers 6 in Figure 9.

As another variation a laminate has been produced similar to that corresponding to Figure 8, but with three print paper layers 2. The thickness of the pressed laminate is 0.8 mm., its bending strength according to DIN 53,452 was found to be 1311 kg./cm.$^2$, its tensile strength according to the DIN standard, supra, is 880 kg./cm.$^2$, and its hardness determined as described above is 5310 kg./cm.$^2$.

Figure 10:
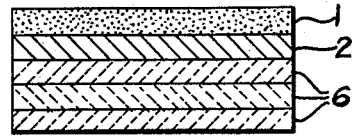

Figure 10 illustrates a stack leading to a laminate having a thickness of 1.0 mm. and being completely free from warping. The stack consists of one overlay 1 impregnated with the bath of Example X in amounts of 300 grams of pre-cured impregnant per 100 grams of alpha-cellulose, superimposed on a layer 2 of print paper impregnated with the bath of Example IX in amounts of 90 grams of pre-cured impregnant per 100 grams of print paper and three layers of kraft paper impregnated with the bath of Example VII in amounts of 60 grams of pre-cured impregnant per 100 grams of paper.

Further combinations of different layers of paper impregnated with different types of baths in different amounts will be obvious to anyone skilled in the lamination art.

THE LAMINATING STEPS IN THE LAMINATING PRESS

The laminating step is carried out in a press of the type described by placing several stacks 7 between metallic pressure plates 8 and the entire assembly between the upper and lower press platens 9 and 10 of the press, while using a pressure-equalizing cushion 11 as illustrated in Figure 11.

Such pressure-equalizing cushions have been used in the past, however, in a different manner by placing them on the press platens 9 and 10 between the latter and the adjacent pressure plates 8, as illustrated in Figure 12. This conventional arrangement suffers from the serious drawback that the heat transmitted from the temperature controlling system of channels 12 in the press platens 9 and 10 is largely absorbed by the cushions 11 and therefore only insufficiently transmitted to the pressure plates 8 and the stacks 7 therebetween. The conventional arrangement involves a great loss of energy in the operation of the press and makes control of the actual temperature attained in each of stacks 7 extremely difficult or impossible, heat being transmitted unevenly through the cushions 11 and being distributed irregularly through the metal plates 8 and stacks 7. The time required for heating up the press is unduly long.

In the novel arrangement according to my invention, as illustrated in Figure 11, heat transfer takes place directly from the heating system 12 through platens 9 and 10 to the metal plates 8 and stacks 7 with no heat transfer at all being required through the single pressure equalizing cushion 11 which is placed centrically between an equal number of metal plates 8 and stacks 7 arranged symmetrically on both sides of cushion 11.

The stacks arranged as illustrated in Figure 11 are introduced into the press and heated up to the operational temperature required during the pressing step proper which, in the laminating step according to my invention, is between 140° C. and 170° C., and preferably in order to shorten the pressing time proper close to about 170° C. Higher temperatures would lead to yellowing and eventual decomposition of the stack. In the known processes, 150° C. was generally considered the upper limit temperature beyond which stacks impregnated with the conventional bath show yellowing effects and eventual decomposition.

Simultaneously with heating up the stacks in the press, pressure between the platens is gradually increased to the full operational pressure ranging from 25 to about 100 kg./cm.$^2$. It is well known in the art in which manner the ultimate mechanical properties of the laminate are influenced by the choice of a corresponding maximum pressure. The mechanical data mentioned herein were imparted to the laminates in question by using an operational pressure of about 70 kg./cm.$^2$.

While, in the conventional laminating methods, the operational pressure is maintained from the instant of reaching the operational temperature until the impregnant in the stacks is substantially completely cured while also maintaining that operational temperature, for periods of at least about 15 minutes and longer, the latter temperature is only maintained, in the process according to my invention, until the impregnate in the stacks is sufficiently cured to allow easy removal of the stacks from the metallic pressure plates, which corresponds only to an initial start of curing requiring a period of about 1 to 5 minutes, and preferably about 3 minutes.

The complete curing of the conventional laminates is controlled in the art by subjecting test samples of the laminates to the Test for Dimensional Change LP 2–2.08 (NEMA Standards). Conventionally produced, fully cured laminates show test results immediately after removal from the press which remain substantially unchanged even after a prolonged post-curing period and already fulfills the standard requirements of the aforesaid test.

The laminates according to my invention, on the other hand, when immediately removed from the press, show test results not yet fulfilling the standard requirements of the aforesaid test LP 2–2.08, but show improving values until, after a storage-curing period of from about one to two months, the test results correspond to the required standards showing that the laminate has been fully cured.

As mentioned above the pressing time at operational temperature is determined for each type of stacks by a trial run.

After the above-mentioned approximately 3 minutes of applying full pressure at operational temperature, heating of the press is interrupted and the laminate is permitted to cool, while still maintaining full pressure until the temperature of the laminate has dropped to about 60° C., and then as the temperature drops further to room temperature, pressure is gradually relieved.

Conventionally, the full pressure was maintained until the laminate had cooled down to room temperature.

The stage-wise cooling described above in the process of my invention is particularly advantageous in the production of thin plates, by avoiding cracking of the latter, which might otherwise easily occur.

It is conventional to accelerate the cooling step by causing a coolant, for instance cold water, to flow through the heating system of the press platens.

If the sheets forming the stacks had been previously properly prepared and pre-cured by drying as described, no intermediary pressure relief period should be required. If the content of volatile components in the sheets is found to be unduly high, a short pressure relief of a few seconds at the instant of reaching full operational temperature in the press is indicated.

The laminates as removed from the press can be transported and worked immediately, while the fully cured state will only be reached after a period of several weeks, as mentioned above.

The mechanical properties of two laminates produced according to the invention are listed in the following table, for the sake of comparison, with those of a conventional laminate. It should be noted that these mechanical properties of the laminates according to the invention are at least as good or even better than those of the conventionally laminated sheets.

MECHANICAL PROPERTIES OF LAMINATES

| Type of Test | Conventional Laminate | Laminate according to Fig. 8 (2 print papers) | Laminate according to Fig. 8 (3 print papers) |
|---|---|---|---|
| thickness, mm | 1.3 | 0.6 | 0.8 |
| weight (kg./m.² per 1 mm. thickness) | 1.4 | 1.47 | |
| tensile strength (kg./cm.²) | 800 | 1,171 | 880 |
| bending strength (kg./cm.²) (DIN 53 452) | 1,300 | 1,190 | 1,311 |
| ball hardness (kg./cm.²) (50 kg., ball diameter 5 mm.; 60 seconds) | 2,000-2,500 | 4,912 | 5,310 |

It is particularly noticeable that in spite of the fact that the laminates according to the invention are much thinner, their resistance to bending is practically as great as that of the conventional plates, while their tensile strength and in particular their ball hardness is greater.

The laminates according to the invention are useful as structural plates where light weight, great resilience and high tensile strength, i.e. toughness of the plates is required.

It will be understood that this invention is susceptible to further modification and, accordingly, it is desired to comprehend such modifications within this invention as may fall within the scope of the appended claims.

What is claimed is:

1. As an article of manufacture, a thin, flexible laminated sheet material comprising a plurality of superimposed fibrous sheets containing a heat-cured melamine-aldehyde resin modified with polyvinyl acetate and glyoxal, said laminated sheet material being tenaciously bonded together with said heat-cured modified melamine-aldehyde resin, and which laminated sheet comprises a hard, smooth outer surface layer.

2. As an article of manufacture, a laminated sheet material composed of a plurality of superimposed fibrous sheets containing a heat-cured melamine-formaldehyde resin modified with polyvinyl acetate and glyoxal, and said laminated sheet material being tenaciously bonded together with said resin and having a smooth, hard outer surface layer.

3. As an article of manufacture, a laminated sheet material composed of a plurality of superimposed fibrous sheets which is impregnated and tenaciously bonded together with a heat-cured melamine-formaldehyde resin modified with polyvinyl acetate, glyoxal and alpha dichlorohydrin, said laminated sheet material having a smooth, hard outer surface layer.

References Cited in the file of this patent

UNITED STATES PATENTS

| 1,851,177 | Harvey, et al. | Mar. 29, 1932 |
| 2,325,376 | D'Alelio | July 27, 1943 |
| 2,415,763 | Ryan | Feb. 11, 1947 |
| 2,525,676 | Hoffman | Oct. 10, 1950 |
| 2,680,700 | Meyers | June 8, 1954 |
| 2,694,028 | Rapp | Nov. 9, 1954 |
| 2,728,741 | Simon | Dec. 27, 1955 |
| 2,769,796 | Jiueq Suen | Nov. 6, 1956 |
| 2,773,793 | Fraser | Dec. 11, 1956 |
| 2,773,794 | Fraser | Dec. 11, 1956 |

OTHER REFERENCES

The Condensed Chemical Dictionary, 4th Ed., Reinhold Publishing Corp.